US008903847B2

(12) United States Patent
Bailey et al.

(10) Patent No.: US 8,903,847 B2
(45) Date of Patent: Dec. 2, 2014

(54) DIGITAL MEDIA VOICE TAGS IN SOCIAL NETWORKS

(75) Inventors: Mark Bailey, Hawthorne, NY (US); James E. Christensen, Hawthorne, NY (US); Catalina M. Danis, Hawthorne, NY (US); Jason B. Ellis, Hawthorne, NY (US); Thomas D. Erickson, S. Minneapolis, MN (US); Robert G. Farrell, Hawthorne, NY (US); Wendy A. Kellogg, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/718,041

(22) Filed: Mar. 5, 2010

(65) Prior Publication Data

US 2011/0219018 A1 Sep. 8, 2011

(51) Int. Cl.
*G06F 7/00* (2006.01)
*G06F 17/30* (2006.01)
*G10L 15/00* (2013.01)
*G10L 15/26* (2006.01)
*G10L 15/10* (2006.01)
*G10L 17/00* (2013.01)
*G06F 15/16* (2006.01)
*H04M 3/493* (2006.01)

(52) U.S. Cl.
CPC .............. *G10L 15/10* (2013.01); *G10L 15/26* (2013.01); *G06F 17/30244* (2013.01); *G10L 17/005* (2013.01); *Y10S 707/915* (2013.01); *Y10S 707/916* (2013.01); *H04M 3/4936* (2013.01); *H04M 2203/303* (2013.01)
USPC ............ 707/769; 704/235; 707/915; 707/916

(58) Field of Classification Search
USPC ........... 707/769, 736, 914, 915, 916; 704/235
See application file for complete search history.

(56) References Cited

U.S. PATENT DOCUMENTS

| 1,191,425 A | 7/1916 | Huddle |
| 4,592,085 A | 5/1986 | Watari et al. |

(Continued)

FOREIGN PATENT DOCUMENTS

| CA | 2493180 A1 | 7/2005 |
| CN | 1852354 A | 10/2006 |

(Continued)

OTHER PUBLICATIONS

International Search Report; International Application No.: PCT/US11/23557; International Filing Date: Feb. 3, 2011; Date of Mailing: Apr. 4, 2011.
International Search Report—Written Opinion; International Application No.: PCT/US11/23557; International Filing Date: Feb. 3, 2011; Date of Mailing: Apr. 4, 2011.

(Continued)

*Primary Examiner* — Greta Robinson
*Assistant Examiner* — Brian E. Weinrich
(74) *Attorney, Agent, or Firm* — Cantor Colburn LLP; Preston Young

(57) ABSTRACT

A voice tagging system includes a client computing device that includes a media object capture device and a voice capture device and runs a client application that associates media objects to voice samples. The system also includes a communications network coupled to the client computing device, a voice tagging system coupled to the communications network and receiving at least one association between a first media object and a first voice sample, and a database coupled to the voice tagging system, the database including one or more voice tags, each voice tag being coupled to one or more voice samples.

3 Claims, 8 Drawing Sheets

(56) References Cited

U.S. PATENT DOCUMENTS

| | | |
|---|---|---|
| 5,390,278 A | 2/1995 | Gupta et al. |
| 5,422,816 A | 6/1995 | Sprague et al. |
| 6,718,368 B1 | 4/2004 | Ayyadurai |
| 6,834,270 B1 | 12/2004 | Pagani et al. |
| 6,879,257 B2 | 4/2005 | Hisano et al. |
| 7,003,570 B2 | 2/2006 | Messinger et al. |
| 7,047,027 B2 | 5/2006 | Jeon |
| 7,065,544 B2 | 6/2006 | Moreno |
| 7,151,490 B2 | 12/2006 | Richards |
| 7,163,151 B2 | 1/2007 | Kiiskinen |
| 7,177,795 B1 * | 2/2007 | Chen et al. ............... 704/231 |
| 7,209,949 B2 | 4/2007 | Mousseau et al. |
| 7,225,249 B1 | 5/2007 | Barry et al. |
| 7,228,228 B2 | 6/2007 | Bartlett et al. |
| 7,263,597 B2 | 8/2007 | Everdell et al. |
| 7,266,754 B2 | 9/2007 | Shah et al. |
| 7,337,115 B2 | 2/2008 | Liu et al. |
| 7,512,659 B2 | 3/2009 | Keohane et al. |
| 7,551,935 B2 | 6/2009 | Karmakar |
| 7,634,528 B2 | 12/2009 | Horvitz et al. |
| 7,650,376 B1 | 1/2010 | Blumenau |
| 7,693,945 B1 | 4/2010 | Dulitz et al. |
| 7,729,689 B2 | 6/2010 | Chakraborty et al. |
| 7,886,083 B2 | 2/2011 | Pinkerton et al. |
| 7,917,911 B2 | 3/2011 | Bansal et al. |
| 7,970,923 B2 | 6/2011 | Pedersen et al. |
| 8,209,620 B2 | 6/2012 | Dempski et al. |
| 8,539,542 B1 | 9/2013 | Elhag et al. |
| 2002/0138582 A1 | 9/2002 | Chandra et al. |
| 2002/0165961 A1 | 11/2002 | Everdell et al. |
| 2003/0009385 A1 | 1/2003 | Tucciarone et al. |
| 2003/0031309 A1 | 2/2003 | Rupe et al. |
| 2003/0033394 A1 | 2/2003 | Stine |
| 2003/0115366 A1 | 6/2003 | Robinson |
| 2003/0120822 A1 | 6/2003 | Langrind et al. |
| 2003/0182421 A1 | 9/2003 | Faybishenko et al. |
| 2004/0019648 A1 | 1/2004 | Huynh et al. |
| 2004/0022264 A1 | 2/2004 | McCue |
| 2004/0024817 A1 | 2/2004 | Pinkas |
| 2004/0260551 A1 | 12/2004 | Atkin et al. |
| 2005/0010573 A1 | 1/2005 | Garg |
| 2005/0038660 A1 * | 2/2005 | Black et al. ............... 704/275 |
| 2005/0060372 A1 | 3/2005 | DeBettencourt et al. |
| 2005/0060381 A1 | 3/2005 | Huynh et al. |
| 2005/0102625 A1 | 5/2005 | Lee et al. |
| 2005/0114357 A1 * | 5/2005 | Chengalvarayan et al. .. 707/100 |
| 2005/0171768 A1 | 8/2005 | Gierach |
| 2005/0192808 A1 | 9/2005 | Sugiyama |
| 2005/0198270 A1 | 9/2005 | Rusche et al. |
| 2006/0015339 A1 * | 1/2006 | Charlesworth et al. ....... 704/251 |
| 2006/0036441 A1 * | 2/2006 | Hirota ................... 704/270.1 |
| 2006/0109976 A1 | 5/2006 | Sundaram et al. |
| 2006/0155854 A1 | 7/2006 | Selgert |
| 2006/0287867 A1 | 12/2006 | Cheng et al. |
| 2007/0008069 A1 | 1/2007 | Lastinger et al. |
| 2007/0019793 A1 | 1/2007 | Cheng |
| 2007/0025543 A1 | 2/2007 | Vadlakonda et al. |
| 2007/0033229 A1 * | 2/2007 | Fassett et al. .......... 707/999.107 |
| 2007/0078986 A1 | 4/2007 | Ethier et al. |
| 2007/0171066 A1 | 7/2007 | Fein et al. |
| 2007/0174326 A1 | 7/2007 | Schwartz et al. |
| 2007/0192422 A1 | 8/2007 | Stark et al. |
| 2007/0237135 A1 | 10/2007 | Trevallyn-Jones et al. |
| 2007/0290787 A1 | 12/2007 | Fiatal et al. |
| 2008/0004056 A1 | 1/2008 | Suzman |
| 2008/0057922 A1 | 3/2008 | Kokes et al. |
| 2008/0075433 A1 | 3/2008 | Gustafsson |
| 2008/0083024 A1 | 4/2008 | Glazer et al. |
| 2008/0091723 A1 | 4/2008 | Zuckerberg et al. |
| 2008/0134205 A1 | 6/2008 | Bansal et al. |
| 2008/0155534 A1 | 6/2008 | Boss et al. |
| 2008/0159266 A1 | 7/2008 | Chen et al. |
| 2008/0162132 A1 | 7/2008 | Doulton |
| 2008/0233977 A1 | 9/2008 | Xu et al. |
| 2008/0233981 A1 | 9/2008 | Ismail |
| 2009/0012841 A1 | 1/2009 | Saft et al. |
| 2009/0031006 A1 | 1/2009 | Johnson |
| 2009/0037515 A1 | 2/2009 | Zapata et al. |
| 2009/0062949 A1 * | 3/2009 | Heo et al. ............... 700/94 |
| 2009/0094190 A1 | 4/2009 | Stephens |
| 2009/0099906 A1 | 4/2009 | Kirley et al. |
| 2009/0125595 A1 | 5/2009 | Maes |
| 2009/0128335 A1 | 5/2009 | Leung |
| 2009/0131080 A1 | 5/2009 | Nadler et al. |
| 2009/0131087 A1 | 5/2009 | Johan |
| 2009/0150501 A1 | 6/2009 | Davis et al. |
| 2009/0150786 A1 | 6/2009 | Brown |
| 2009/0164287 A1 | 6/2009 | Kies et al. |
| 2009/0186641 A1 | 7/2009 | Vaananen |
| 2009/0191902 A1 | 7/2009 | Osborne |
| 2009/0199114 A1 | 8/2009 | Lewis et al. |
| 2009/0210226 A1 * | 8/2009 | Ma ................... 704/236 |
| 2009/0216805 A1 | 8/2009 | Coffman et al. |
| 2009/0265631 A1 | 10/2009 | Sigurbjornsson |
| 2009/0270068 A1 | 10/2009 | Ahopelto et al. |
| 2009/0271380 A1 | 10/2009 | Julia et al. |
| 2009/0276488 A1 | 11/2009 | Alstad |
| 2010/0015956 A1 | 1/2010 | Qu et al. |
| 2010/0023451 A1 | 1/2010 | Lambert et al. |
| 2010/0023475 A1 | 1/2010 | Lahav |
| 2010/0023506 A1 | 1/2010 | Sahni et al. |
| 2010/0030578 A1 | 2/2010 | Siddique et al. |
| 2010/0048242 A1 | 2/2010 | Rhoads et al. |
| 2010/0049599 A1 | 2/2010 | Owen et al. |
| 2010/0087172 A1 | 4/2010 | Klassen et al. |
| 2010/0122331 A1 | 5/2010 | Wang et al. |
| 2010/0128335 A1 | 5/2010 | Maeda et al. |
| 2010/0158236 A1 | 6/2010 | Chang et al. |
| 2010/0174622 A1 * | 7/2010 | Sohn et al. ............... 705/27 |
| 2010/0201845 A1 | 8/2010 | Feinberg et al. |
| 2010/0210248 A1 | 8/2010 | Morrissey et al. |
| 2010/0211868 A1 | 8/2010 | Karmarkar et al. |
| 2010/0287197 A1 | 11/2010 | Wang et al. |
| 2010/0296646 A1 | 11/2010 | Hemm et al. |
| 2011/0021178 A1 * | 1/2011 | Balasaygun et al. .......... 455/413 |
| 2011/0035284 A1 | 2/2011 | Moshfeghi |
| 2011/0061068 A1 | 3/2011 | Ali et al. |
| 2011/0072015 A1 | 3/2011 | Lin et al. |
| 2011/0077941 A1 | 3/2011 | Dey et al. |
| 2011/0141855 A1 | 6/2011 | Gault et al. |
| 2011/0145356 A1 | 6/2011 | Tanner |
| 2011/0153723 A1 | 6/2011 | Mutnuru et al. |
| 2011/0153839 A1 | 6/2011 | Rajan et al. |
| 2011/0212736 A1 | 9/2011 | Jaime et al. |
| 2011/0219018 A1 | 9/2011 | Bailey et al. |
| 2011/0221960 A1 | 9/2011 | Glaznev et al. |
| 2011/0231747 A1 | 9/2011 | Zuckerberg et al. |
| 2011/0244887 A1 | 10/2011 | Dupray et al. |
| 2011/0246560 A1 | 10/2011 | Gibson |
| 2011/0276513 A1 | 11/2011 | Erhart et al. |
| 2012/0134548 A1 | 5/2012 | Rhoads |
| 2012/0246238 A1 | 9/2012 | Bailey et al. |
| 2012/0266102 A1 | 10/2012 | Dempski et al. |
| 2013/0100301 A1 | 4/2013 | Rhoads |
| 2013/0166332 A1 | 6/2013 | Hammad |
| 2014/0111354 A1 | 4/2014 | Hergesheimer et al. |

FOREIGN PATENT DOCUMENTS

| | | |
|---|---|---|
| EP | 1340096 A1 | 9/2003 |
| GB | 2396520 A | 6/2004 |
| GB | 2461730 A | 1/2010 |
| JP | 2009134774 | 6/2009 |
| WO | 0241029 A1 | 5/2002 |
| WO | 2005025155 A1 | 3/2005 |
| WO | 2006127791 A2 | 11/2006 |
| WO | 2007086683 A1 | 8/2007 |
| WO | 2008026945 A1 | 3/2008 |
| WO | 2009012516 A1 | 1/2009 |
| WO | 2009135292 A1 | 11/2009 |

(56) References Cited

OTHER PUBLICATIONS

IBM et al., "Apparatus for Sending a Sequence of Asynchronous Messages Through the Same Channel in a Messaging Middleware Cluster," Published Oct. 4, 2005, Copyright IP.com, Inc., pp. 1-7.
Anind K. Dey and Gregory D. Abowd, "CybreMinder: A Context Aware System for Supporting Reminders," HUC 2000, LNCS 1927, pp. 172-186, 2000.
ACM Digital Library, [online]; [retrieved on Mar. 14, 2011]; retrieved from the Internet http://portal.acm.org/citation.cfm?id=1670452 Alberto Gonzalez Prieto et al.,"Adaptive Performance Management for SMS Systems," Journal of Network and Systems Management; vol. 17 Issue 4, Dec. 2009.
NMS Adaptive, [online]; [retrieved on Mar. 14, 2011]; retrieved from the Internet http://www.nms-adaptive.com/products/pages/desktop-sms-frameset.htm.
Carnegie Mellon University, [online]; [retrieved on Mar. 14, 2011]; retrieved from the Internet http://citeseerx.ist.psu.edu/viewdoc/download?doi=10.1.1.70.4047&rep=rep1&type=pdf Daniel Siewiorek et al.,"SenSay: A Context-Aware Mobile Phone," 2003.
The Symbian Blog [online]; [retrieved on Mar. 15, 2011]; retrieved from the Internet http://www.symbianzone.co.cc/2010/08/sms-tag-v10-sms-organizer-symbian-os-94.html Symbian SMS Tag Organizer; 2010.
AdaptiveMobile [online]; [retrieved on Mar. 15, 2011]; retrieved from the Internet http://www.adaptivemobile.com 2011.
V. Zhumatiy et al., "Metric State Space Reinforcement Learning for a Vision-Capable Mobile Robot," Technical Report; IDSIA; Mar. 2006.
Ricci et al., "Acquiring and Revising Preferences in a Critique-Based Mobile Recommender System," May/Jun. 2007, vol. 22, No. 3, IEEE Computer Society, Copyright 2007 IEEE.
T. Blackwell, "Fast Decoding of Tagged Message Formats," Proceeding IEEE INFOCOM '96, Mar. 24-28, 1996, Copyright 1996 IEEE, pp. 224-231.
International Preliminary Report on Patentability for International Patent Application No.: PCT/US2011/023557; International Filing Date: Feb. 3, 2011; 5 pages.
Bae et al., "TagReel: A Visualization of Tag Relations among User Interests in the Social Tagging System", 2009 Six International Conference on Computer Graphics, Imaging and Visualization, IEEE Computer society, 2009, pp. 437-442.
Best Shareware, "Sound Pix Plus", http://www.bestshareware.net/download/soundpixplus.htm, retrieved from the internet on Jan. 12, 2012, 2 pages.
Computerworld, "Facebook photo privacy PANIC: Auto-tag apology and apologia", http://blogs.computerworld.com/18435/facebook_photo_privacy_panic_auto_tag_apology_and_apologia, retrieved from the internet on Jan. 12, 2012, 7 pages.
Digital Photography School, "Columbus V-900 GPS Voice Photo Data Logger Review", http://www.digital-photography-school.com/columbus-v-900-gps-voice-photo-data-logger-review, retrieved from the internet on Jan. 12, 2012, 3 pages.
Google Image Labeler, http://en.wikipedia.org/wiki/Google_Image_Labeler, Aug. 31, 2006, 4 pages.
Hosy, Marc, Indexing/Labeling?Enhancing digital pictures using Voice Tags/Commands/Comments, www.ip.com, IP.com electronicl IPCOM000169425D; Publication Apr. 22, 2008; 3 pages.
Mobile Phones Nokia patents voice tagging of hotos, http://www.mobilephones.org.uk/nokia/nokia-patents-voice-tagging-of-photos/, retrieved from the internet on Apr. 12, 2012, 4 pages.
resco.net Developer & Mobile Enterprise, "How to use mobile devices camera and microphone in business applications", http://www.resco.net/developer/company/articles.aspx?file=articles/article14, retrieved from the internet on Jan. 12, 2012, 6 pages.
"Sentiment140", http://help.sentiment140.com/, retrieved from Internet May 8, 2012, 2 pages.
The Stanford Natural Language Processing Group, "Stanford Log-linear Part-Of_Speech Tagger", http://npl.stanford.edu/software/tagger.shtml, retrieved from the internet on Apr. 11, 2012, 3 pages.

\* cited by examiner

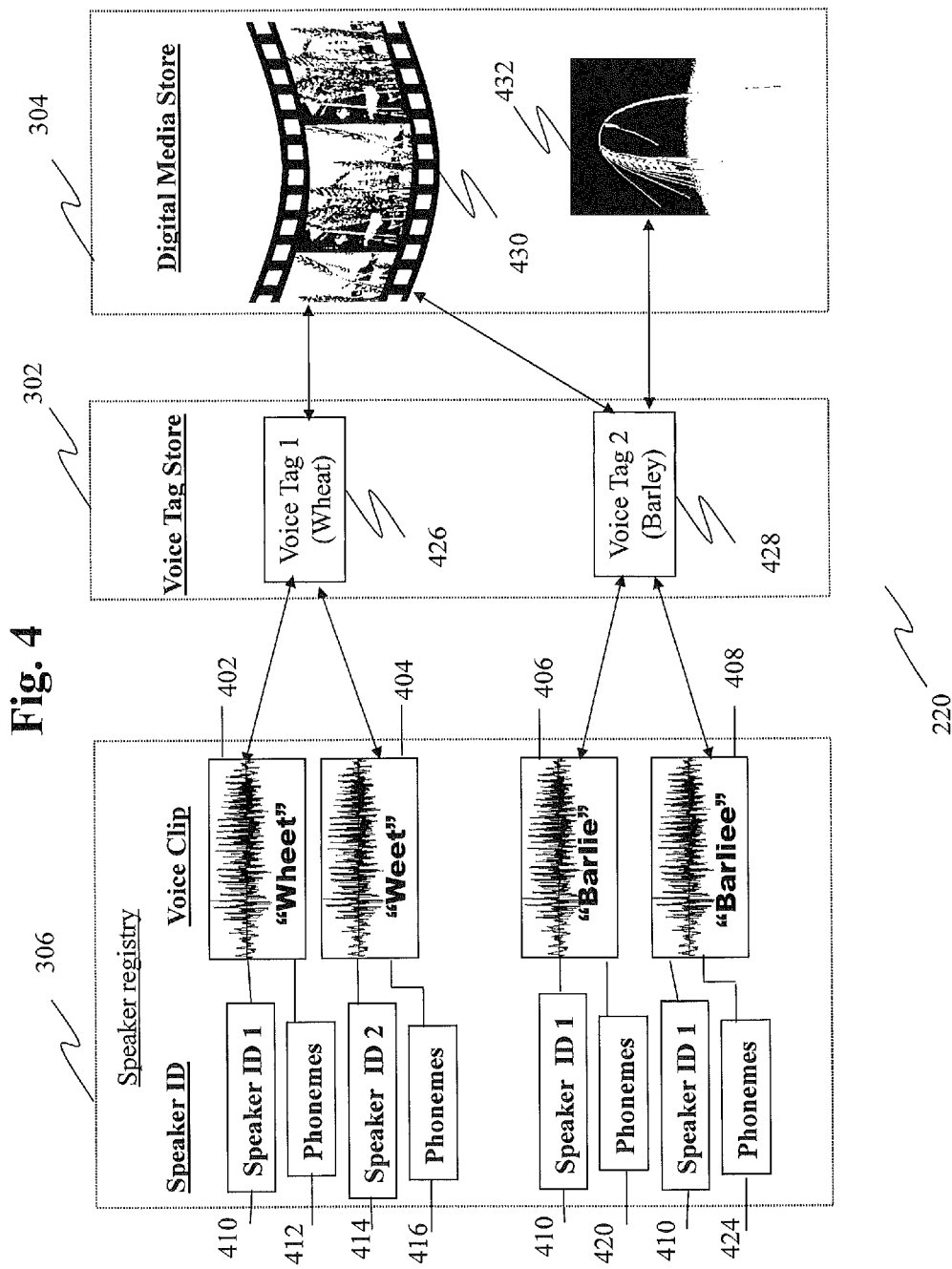

DIGITAL MEDIA VOICE TAGS IN SOCIAL NETWORKS

BACKGROUND

The present invention relates to characterizing media, and more specifically, characterizing digital media with voice tags.

Digital libraries, photo sharing sites, image search engines, on-line encyclopedias, and other computer systems all hold large numbers of images in file systems or databases. Users accessing these sites may have trouble finding desired images because, unlike documents, images (and other digital media) do not include words or phrases that can be indexed.

One solution to the problem of finding desired images is image recognition, but this approach is prohibitively expensive for user-generated content, and is not highly accurate. Another known method is to group images in named categories (such as folders) to facilitate access. This requires, however, manual effort and the images must be known ahead of time.

There are many ways of organizing these images, including collections, sets, and hierarchies. One common method to organize a collection is tagging. When a user sees the image, the user may type in a word or phrase to "tag" (describe) the image. Multiple users can add one or more tags to the same image. When another user accesses the site, they can then navigate to the images labeled by particular tags.

There are various ways image navigation using tags may be accomplished. For instance, the user may type in a word or phrase that is an existing tag for a set of one or more images. Alternatively, a user may see the tags arranged in various ways (alphabetically, by popularity, etc.) and then choose a tag which describes the image(s). The efficacy of text tagging for social navigation is widely used and well understood.

There are also ways of presenting digital media so that users can scan and identify items (collages, grids, visualizations). A major drawback of these approaches is that they are not scaleable: the display becomes cluttered and the screen may run out of pixels, particularly on small screens such as on mobile devices.

There are also ways to 'automatically' process digital media to derive metadata that can then be used for searching. Metadata (location, time) may be captured at the time of image acquisition and subsequently used to navigate to the visual digital media.

However, there are many situations in which creating or using textual tags is not possible or is inconvenient. Examples include when users: are using mobile phones (takes a long time or diverts attention from a visual task to type in a word or phrase); are physically disabled (cannot type the words or phrases); are illiterate or semi-literate because of limited education (have only a limited ability to read or write); or have vision problems (cannot see the words or phrases) or combinations of these situations.

SUMMARY

According to one embodiment of the present invention, a system including a client computing device that includes a media object capture device and a voice capture device and running a client application that associates media objects to voice samples is provided. The system of this embodiment also includes a communications network coupled to the client computing device, a voice tagging system coupled to the communications network and receiving at least one association between a first media object and a first voice sample and a database coupled to the voice tagging system, the database including one or more voice tags, each voice tag being coupled to one or more voice samples.

According to another embodiment of the present invention, a method of tagging media objects is disclosed. The method of this embodiment includes: receiving at a server an association between a first voice sample and a first media object; comparing the first voice sample to one or more other voice samples; linking the first voice sample to a first voice tag; linking the first voice tag to the first media object; and storing the first voice sample, the first voice tag, the first media object and any links between them in a database coupled to the server.

According to another embodiment of the present invention, a method searching a digital database containing voice tagged media objects is disclosed. The method includes: receiving a first audio search at a server; comparing the first audio search to digital representations of voice tags stored in the digital database; and returning one or more media objects linked to voice tags matching the first audio search.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a more detailed depiction of the database shown in FIG. 3;

DETAILED DESCRIPTION

Embodiments of the present invention may address some or all of the problems described above or others not mentioned. The systems and methods of the present invention may, in some cases, allow users to tag media objects with audio identifiers. These audio identifiers may be referred to herein as "voice samples." In addition, the present invention includes systems and methods for searching media objects linked to voice samples in a database based on a "voice queries." A voice query is a sequence of words in a human language, each word consisting of a sequence of phonemes. If a voice query sounds like one or more voice samples, these tags linked to these voice samples will be used to retrieve media objects.

In one embodiment, methods are provided for users to tag digital media with an audio recording of their voice saying a word or phrase and another for users to search and browse digital media using these voice tags. It should be understood that a "user" is the person saying the word or phrase, not necessarily the owner of the device to which voice tags are provided.

Specifically, some embodiments provide systems and methods for tagging images and other digital media with spoken audio (e.g., words and phrases). The systems and methods disclosed herein may include the ability to recognize a sequence of phonemes in a voice sample as the tag. Subsequently, if the same or another user speaks a closely matching sequence of phonemes the systems and method disclosed herein can retrieve the digital media.

A method is also provided for a user to listen to voice tags and select one of the tags to then retrieve the associated digital media. Tags can be arranged alphabetically, by popularity, in a hierarchy, or other ways. In a hierarchy, more general tags may be presented before more specific ones, and tags may have synonyms, as determined by user judgment of the tag's level of specificity or similarity. If a tag is selected at a given level, then more specific tags at the next level down may be presented or a new synonym for the selected tag can be recorded. If no tag is selected at a given level, then a tag can be recorded and added to the hierarchy at this level. When the user listens to voice tags, audio characteristics (e.g., loudness) of the linked voice samples may be used to indicate popularity or other characteristics of the tag relative to the entire set of tags and the identity if the speaker may be used to select tags or particular voice samples of tags according to preferences. For example, one may prefer to hear one's own voice for a tag before other users' voices.

Figure 1:
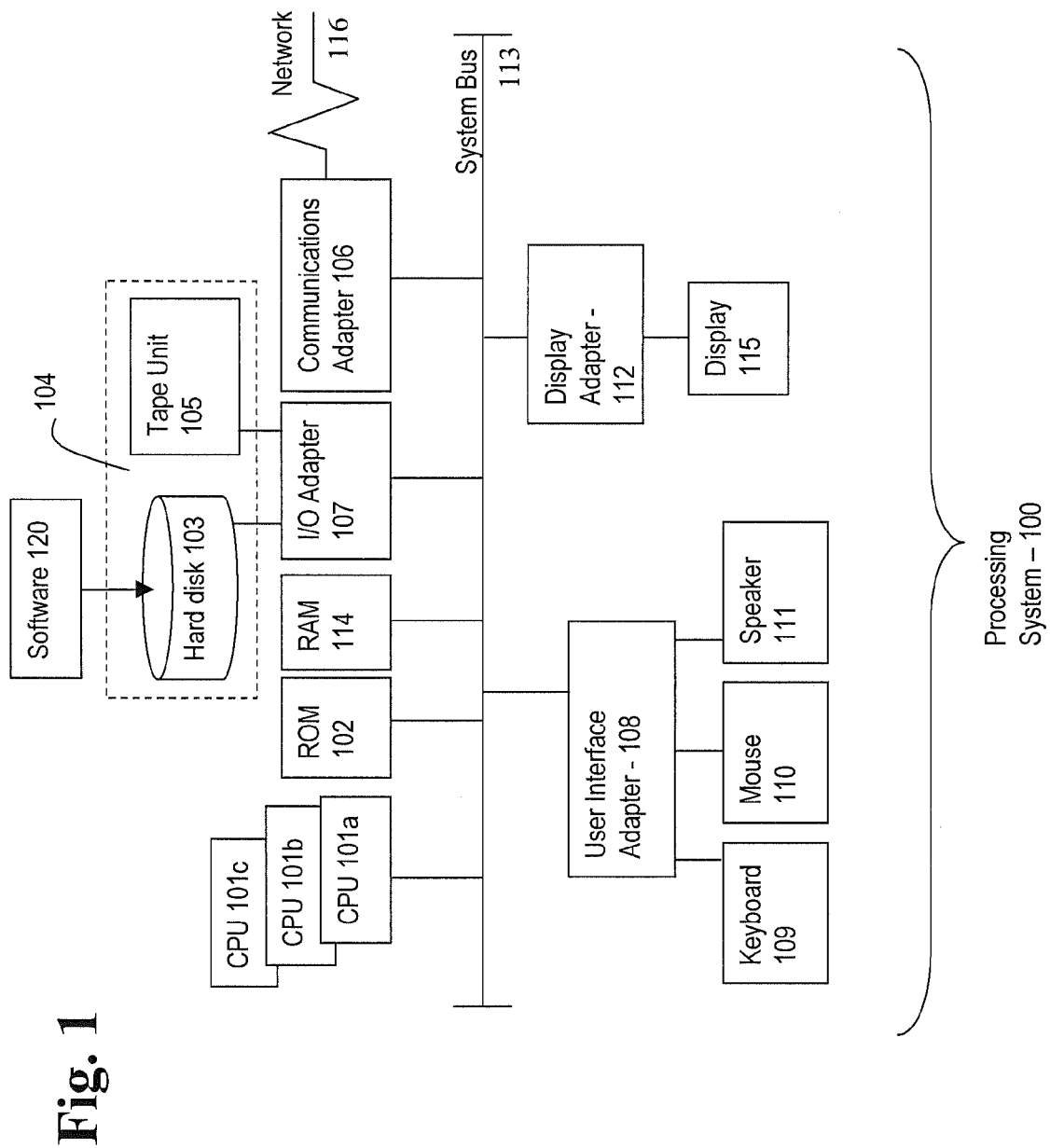
FIG. 1 shows an example of computing system on which embodiments of the present invention may be implemented.

FIG. 1 shows an example of a computing system on which embodiments of the present invention may be implemented. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. Of course, other inputs, such as a digital camera or digital video camera (or other means of supplying one or more images in a digital format) and a microphone may be included as additional input devices.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Examples of operating systems that may be supported by the system 100 include Windows 95, Windows 98, Windows NT 4.0, Windows XP, Windows 2000, Windows CE, Windows Vista, Mac OS, Java, AIX, LINUX, and UNIX, or any other suitable operating system. The system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
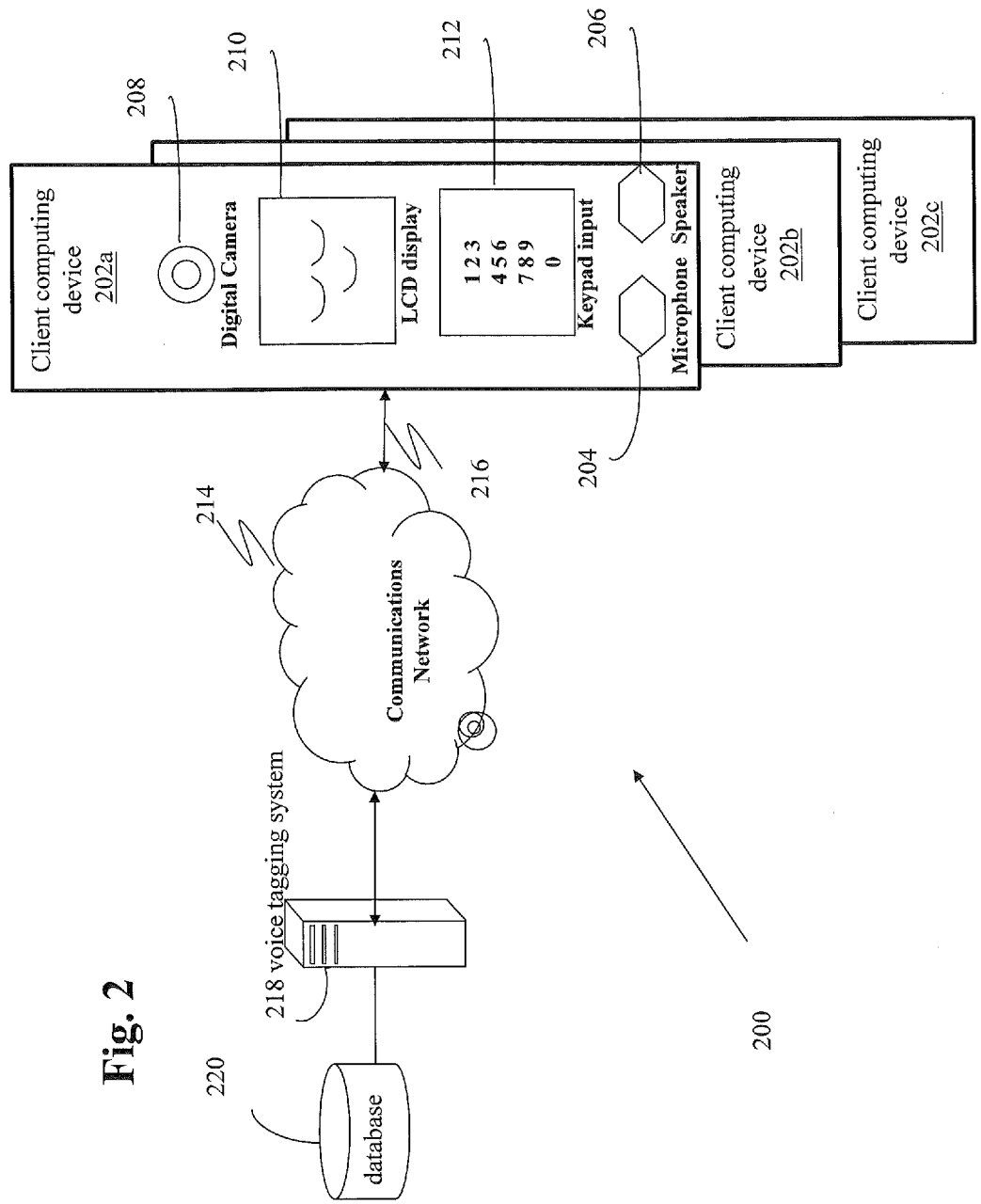
FIG. 2 shows an example of system according to one embodiment of the present invention.

It shall be understood that, in one embodiment, the system of the present invention may be configured in a particular manner and include multiple computing devices. To that end, FIG. 2 shows an example of a system 200 according to one embodiment of the present invention. The system 200 may be utilized to implement methods disclosed herein.

The system 200 includes one or more client computing devices 202a-202c. The client computing device 202a (as well as any other client computing devices such as 202b and 202c) may be any type of computing device. In one embodiment, the client computing device 202a includes a microphone and a speaker. In one embodiment, and as shown in FIG. 2, the client computing device 202a may be a cellular or "smart" phone, a PDA, or other hand held communications (computing) device that includes a microphone 204 and a speaker 206. For completeness, other components of the client computing device 202 may include a digital camera 208, a display screen 210 and an input key pad 212. It shall be understood that some of the components of the client computing device 202a may be combined together. For instance, the display screen 210 may include input capabilities and, therefore, include means for inputting information as well as displaying, for example, images. In one embodiment, the client computing device 202a may include the ability to run a client application, connect to a wireless data network, capture one or more images, display images, capture audio and broadcast audio.

The client computing devices 202a-202c may be coupled to a communications network 214. The communications network 214 may be a cellular network in one embodiment. For example, the communications network 214 could be a GSM, TDMA, 2G, 3G or 4G wireless network. The communications network 214 could also be a wireless data network such as WIMAX or 802.11. Of course, the communications link 216 could be wireless or physical. In one embodiment, the communications network may be an intranet or the Internet.

The system 200 may also include a voice tagging system 218. The voice tagging system 218 is coupled to the communications network 214. Accordingly, the voice tagging system 218 may communicate with the client computing devices 202 over the communications network 214. In one embodiment, the voice tagging system 218 may be implanted on a server. The voice tagging system 218, in some embodiments, may be configured to run a web application that handles requests for media objects and voice tags and performs voice tag matching. In one embodiment, the voice tagging system 218 may include a speech processing unit with a phoneme-level speech model for human language that, given a voice sample, returns the closest matching sequence of phonemes. Of course, the speech processing unit could be in, or could be implemented on, a separate unit.

The system 200 may also include a database 220 coupled to the voice tagging system 218. The database 220 may store information utilized by the voice tagging system 218. In one embodiment, the voice tagging system 218 may include the database 220 within it.

Figure 3A:
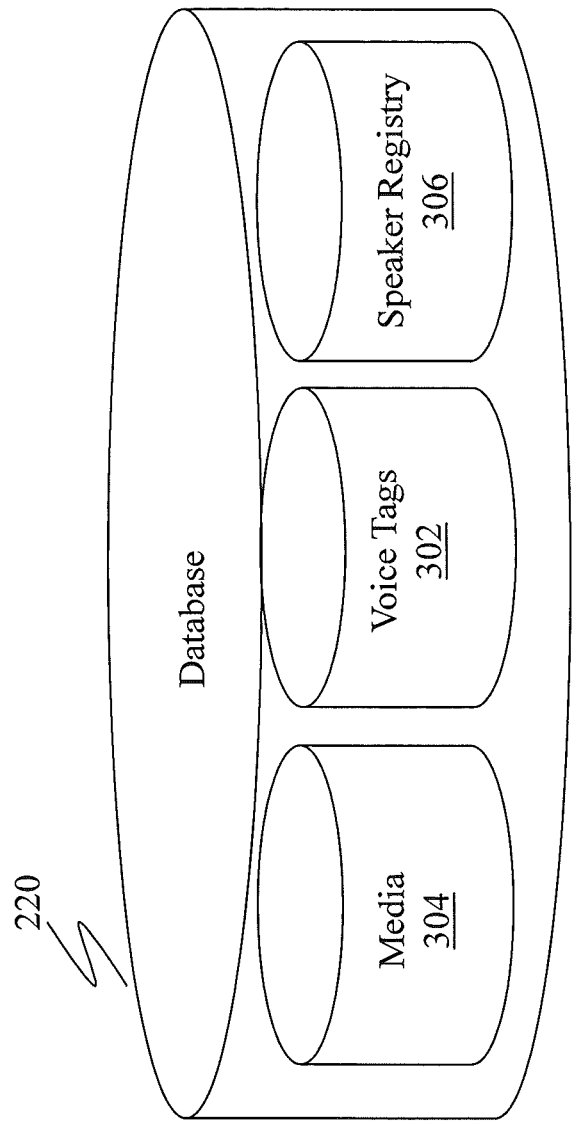
FIG. 3 shows a block diagram of one embodiment of a database that may be utilized in the system shown in FIG. 2.

FIG. 3a shows an example of information that may be stored in the database 220. In one embodiment, the database 220 may include a voice tag store 302, digital media 304 and a speaker registry 306. Of course, the database 220 need not be divided in this particular manner.

The digital media store 304 may include digital media objects. Digital media objects may include any type of media capable of visual reproduction including, but not limited to, images, documents, animations, and videos. It shall be understood that in one embodiment, all of the digital media available to the voice tagging system 218 (FIG. 2) may not be stored in a single location and may be spread over multiple databases 220.

The speaker registry 306 may include voice clips associated with a particular speaker. In one embodiment, some or all of the voice clips may be associated with a phoneme representation of the respective voice clip. This may not be required for voice tagging but may utilized in speaker identify verification (SIV) discussed below.

Voice tags are objects that store associations between one or more voice clips with one or more digital media objects and are stored in the voice tag store 302. In one embodiment, "tagging" shall refer to creating an association between a media object and a voice sample. In contrast, the voice tags in the voice tag store 302 include links to at least one media object and one voice sample.

Figure 3B:
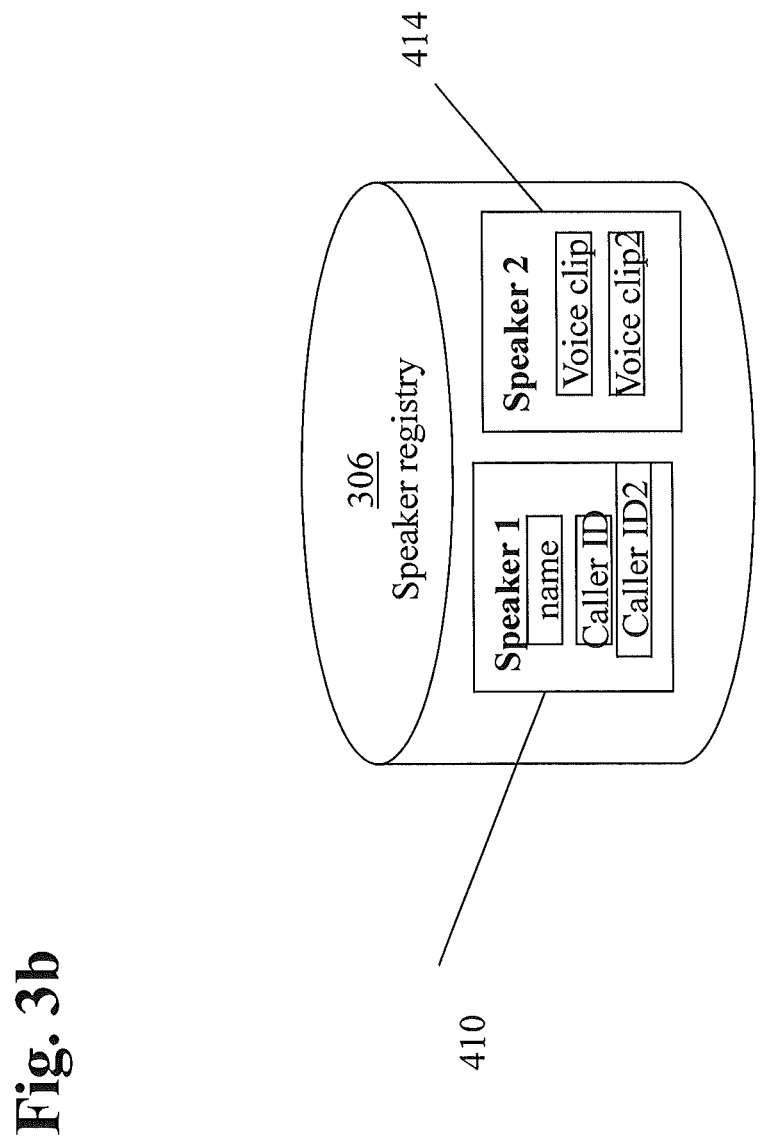

FIG. 3b shows a more detailed version of the speaker registry 306. The speaker registry uniquely identifies users of the voice tagging system. Speakers may have different ways of being identified: typing in their name or a special code using the touch screen, voice clips to match against ("say the word 'baggage'"), phone number from caller ID, or any other ways of coming up with a unique speaker identifier that can be linked to voice clips to identify the speaker who was talking when the voice clip was recorded.

FIG. 4 shows one example of a database 220 with links between the digital media store 304 and the speaker registry 306. In more detail, FIG. 4 shows example of some of the possible connections between voice clips 402, 404, 406 and 408 and digital media objects 430 and 432. The first voice clip 402 represents a clip of a certain speaker speaking the word "wheat." The first voice clip 402 is linked to a speaker identifier 410 and a phoneme representation 412 of the first voice clip 402.

The phoneme representation 412 (as well as any other phoneme representations for other voice clips) may be formed in a number of different manners. In one embodiment, the audio clip may be broken into voice and non-voice segments and then the phonemes for the voice portion may be recognized utilizing known or later developed techniques. As shown, by way of example, the first voice clip 402 may represent the phonemes "hwet" depicted as the letters "wheet".

The first voice tag 426 may also be linked to a second voice clip 404 that is coupled to a second speaker identifier 414 and phoneme representation 416. In this embodiment, the second voice clip 404 represents the phonemes "wet" depicted by the letters "weet." Phoneme matching algorithms may be implemented to infer that, while spoken by the different persons, both the first voice clip 402 and the second voice clip 404 are actually the same word. Such matching may include, for example, voice clips that are classified the same way based upon the start of the word and thus the beginning of the sequence of phonemes for a word. Thus, for example, the first N=3 phonemes in each voice clip is recognized and compared to others. Of course, other classification techniques could be utilized, such as the "edit distance" representing the number of additions, deletions, and moves necessary to make two sequences identical. Regardless, the first voice tag 426 is associated with the first digital media object 430.

The second voice tag 428 is associated with both the first digital media object 430 and the second digital media object 432. This illustrates the principle of the present invention allowing one voice tag to be linked to one or more digital media objects including digital media objects of different types, such as an image and a video. Similar to the first voice tag 426, the second voice tag 428 may be linked to one or more voice clips. In this example, the second voice tag 428 is linked to a third voice clip 406 and a fourth voice clip 408. The third voice clip 406 is linked to a speaker identifier 410 and a phoneme representation 420. Similarly, the fourth voice clip 408 is linked to a speaker identifier 410 and a phoneme representation 424. Of course, the speaker identifiers could be combined in one embodiment.

Users may create associations between voice clips and media objects. These associations may be utilized to create voice tags and create links between voice tags, digital media objects and voice clips as shown in FIG. 4. These links may be created, for example, by the voice tagging system 218 (FIG. 1). The links between the speaker identifier and the voice clip may be created when the voice clip is recorded. The phoneme representation associated with each voice clip may be created and linked to the voice clip by the voice tagging system 218 as well. As shown, Speaker 1 (block 410) spoke both voice clips 406 and 408. When listening to tag 428, voice clip 406 may be preferred because of any number of configurable reasons including clarity, time of speech, volume, etc.

Tagging of Images

Figure 5:
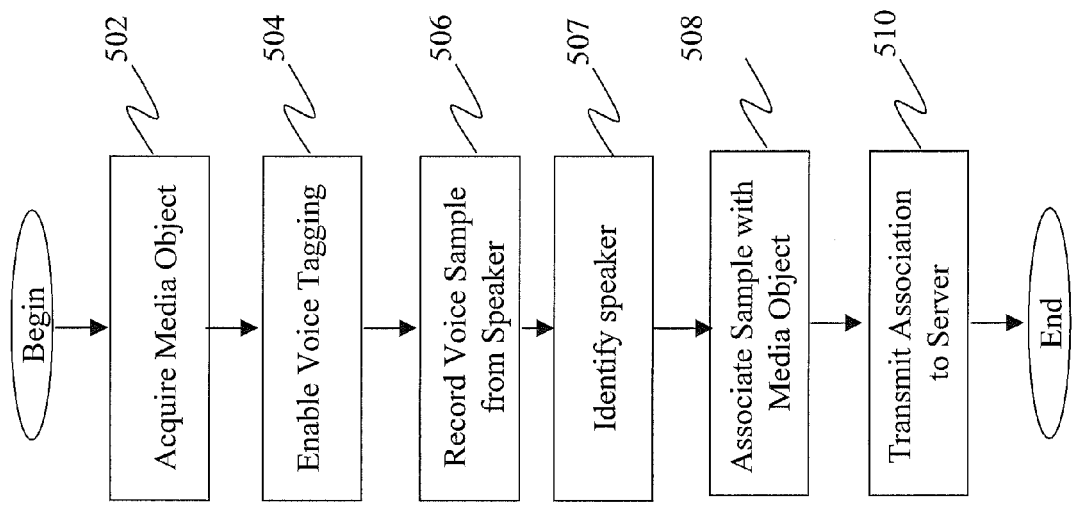
FIG. 5 is flow chart showing a method by which a media object may be tagged according to the present invention.

There are several ways in which an image may be tagged according to the present invention. One method is disclosed with respect to FIG. 5. At a block 502 a media object is acquired and presented to user. The media object may be acquired in different manners. For example, the media object may be acquired by a user taking a picture with a digital camera built into a user's cellular phone. In another embodiment, the media object may be downloaded to a screen of a user's cellular phone from a database. Of course, other methods of acquiring an image may be performed without departing from the present invention. In one embodiment, the media object must visible to the user in order for the image to be tagged. Of course, this is not required.

At a block 504 a voice tagging application is enabled. The voice tagging application may be, for example, a client application capable of receiving voice samples and associating them with an image being viewed. In one embodiment, the voice tagging application is a client application on a cellular phone.

At a block 506, a voice sample is received from a user. In one embodiment, the voice sample may be received while an image or other media object is presented to the user.

At a block 507, a voice sample may be analyzed to determine the identity of the speaker. If no speaker can be identified, the voice tagging system can operate with an anonymous speaker. Various information may be used to determine the speaker identity including but not limited to the caller ID (phone number), speaker identity verification (SIV), and typing in a name on the phone keypad. One or more voice samples stored in the Speaker Registry may also be used to match against the voice sample provided by the user and stored in the speaker registry. Optionally, if there are no matches at block 507, a new speaker identifier may be created in the speaker registry. In such a case, a dialog with the user may be required to record a voice clip, a name, a phone number, or other identifying information.

At a block 508, an association between the voice sample and the media object is created. This association may be between the voice sample and a downloaded media file, media already loaded on the device, or a media object created by the user. Regardless, the association may describe a voice clip's location and the media objects location and the time the association was created.

At a block 510, the association may be transmitted to the voice tagging system. Of course, if the voice sample or the media object were not previously stored in the database, they may be transmitted along with the association. For example, if a user downloads an image from database 220 (FIG. 2) and tags it with a voice sample, only the voice sample and the association may need to be transmitted. What data in addition to the association that is transmitted may be a system specific and configurable and depend on particular situations.

Creating a Database of Tagged Images

Figure 6:
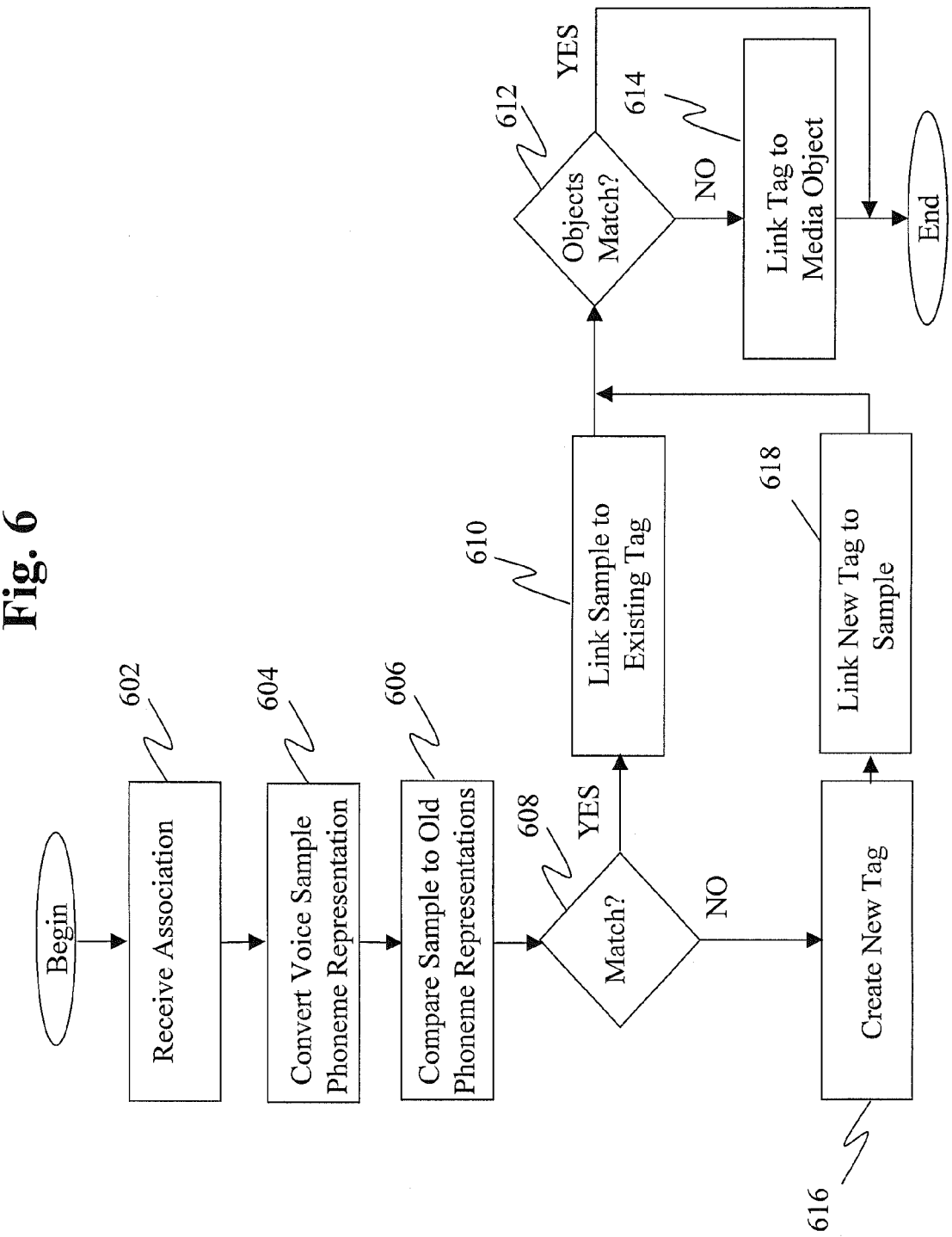
FIG. 6 is a flow chart showing a method of forming a database according to one embodiment of the present invention.

As discussed above, individual users may create associations between voice samples and media objects. These associations form the basis for the links shown in FIG. 4. FIG. 6 is a flow chart showing a method of forming a database according to one embodiment of the present invention.

At a block 602 an association is received. The association associates a voice sample and a media object. The association may come from, for example, simultaneously recording the voice sample and displaying the image. Alternatively, the association may come from a system that allows associations to be made without displaying the image. In one embodiment, one or both of a media object and a voice sample may be received along with the association, in the event, for example, that one or both of the media object or voice sample is not already present in the database. The association may be received, for example, by the voice tagging system 218 (FIG. 2)

At a block 604, the voice sample is converted into a phoneme representation. The phoneme representation may be created by known techniques. The phoneme representation is linked to the voice sample. In addition, if the speaker of the voice sample is known, it may be linked to the creator of the voice sample in the speaker registry. This linking may link every voice sample to at least one speaker identifier. A speaker identifier may identify a unique anonymous user, for example, when a unique speaker cannot be identified, or when speaker identification is not used and thus all voice samples are linked to the anonymous speaker identifier. Of course, multiple samples could be linked to a single identifier.

At a block 606 the phoneme representation of existing voice samples in the database are compared to the phoneme representation for the newly received voice sample. There are many ways to perform such matching. One example includes matching (and thus classifying) words that sound alike based upon the start of the word. Such matching may include: extracting the first M phonemes recognized in the voice sample for each of these N phonemes. For some situations as little as M+3 phonemes may be used. For each voice tag, sequentially compare the phonemes. The tag receives a score based upon the level of match to their Mth phoneme. A match to the M−1th phoneme may be weighted higher than the Mth phoneme. In one embodiment, the level of match is based on the number of matching features of the phonemes, such as voiced and unvoiced consonants, and a no match receives a score of −1. There are 5 features per phoneme, so the best score is a 15 and the worst is a −3.

At a block 608 is determined if a match between the new and an existing voice sample exists. If multiple existing voice samples are retrieved from the database of existing voice samples and match, the user may select the best one. In that event a match exists to a single voice sample, at a block 610 the new voice sample is linked to the voice tag that the existing voice sample is linked to. For example, referring again to FIG. 4, both first 402 and second 404 voice clips are linked to voice tag 426. This may occur because the first voice clip 402 was previously linked to voice tag 426. When the second voice clip 404 is placed into the system, the second phoneme representation 416 matched the first phoneme representation 412. Accordingly, they are both assigned to same voice tag (voice tag 426).

Referring now back to FIG. 6, as discussed above, each voice tag is linked to at least one media object and at least one voice sample. At a block 612 it is determined if the media object linked to the existing voice tag matches the media object associated with the new voice sample. If so, information about the tagging process may be recorded and the process may end. For example, the number of times an image has been tagged may be recorded in the database 220 (FIG. 2). Otherwise, at a block 614, the voice tag is linked to the media object associated with the new voice sample. In this manner, a single voice tag may be associated with multiple media objects.

In the event that there is no match between the new voice sample and an existing voice sample (i.e., this is a voice sample of a word not previously spoken), at a block 616 a new voice tag is created. The newly created voice tag is then, at a block 618, linked to the new voice sample. The newly created voice tag is used for the processing starting at block 612 already described. Thus, if this is an association to a matching media object, then the new voice tag is linked to the media object the voice sample was previously associated with. If this is a non-matching new media object, then the newly created tag will be linked to the new media object. It is thus possible to voice tag a newly captured image using a newly recorded voice sample, where the voice sample does not match any existing tags.

As discussed above, the speaker registry 306 may be utilized to uniquely identify users of the voice tagging system. The information for the speaker may be gathered as described above.

Searching Database of Tagged Images

The above description detailed how a database may be created and modified. the following description describes how the database may be searched in one embodiment.

Figure 7:
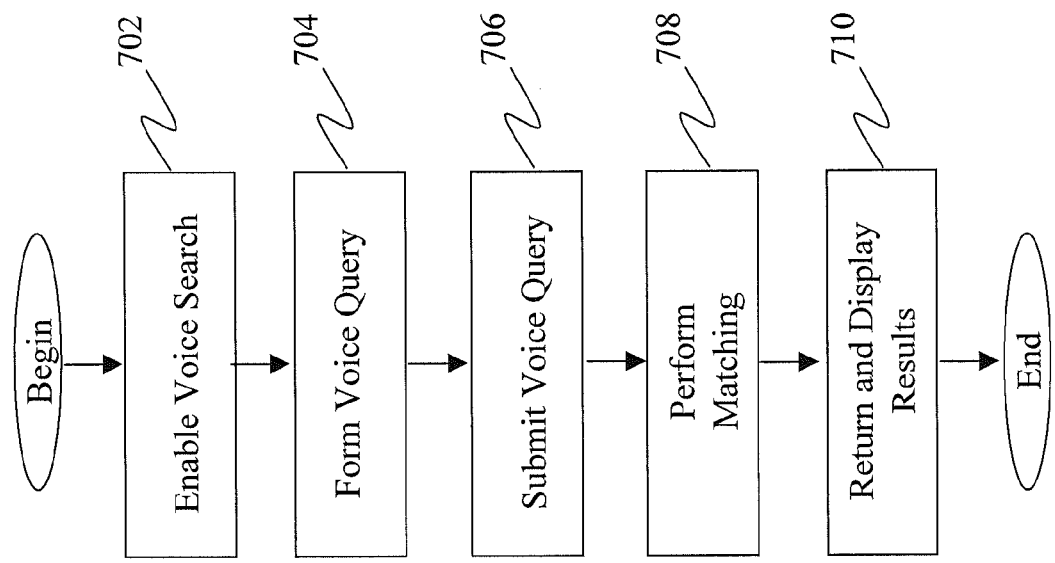
FIG. 7 is a flow chart showing a method of searching and retrieving voice tagged media objects according to one embodiment of the present invention.

FIG. 7 is a flow chart showing a method of searching and retrieving voice tagged media objects. At a block 702, a user of the voice tagging system enables on the system on their client computing devices. In one embodiment, the client computing device may be a cellular phone. In another embodiment, a touchscreen device capable of taking pictures and recording and playing sound and operating over a WiFi network may form the client computing device.

At a block 704 a search utilizing voice search terms is created. This may include the user saying words into a microphone. The search is then submitted to the server at a block 706.

At a block 708, the server (e.g., voice tagging system 218, FIG. 2) matches the voice search term(s) to existing voice tags. This matching may include breaking the search term(s) into voice and non-voice segments. Then, for each voice segment, a phoneme representation may be formed. These phoneme representations may be compared to existing phoneme representations linked to voice tags and a "match score" is created for each voice tag based upon the match score of the phoneme representations of existing voice samples stored with the voice tag. The best match may be determined for each voice tag using the match score described above.

At a block 710 results are returned to the searcher. In the event that multiple voice tags have a high enough score, those tags are returned. In the event that no tags are found, such may be indicated to the searcher. Assuming there is a match, the associations are presented to the user. One or more matching media objects linked to the selected tags are displayed to the searcher. Selecting a matching media object on a touchscreen device may play the voice tags associated with each media object by playing the associated voice sample with the best score.

In an alternate embodiment, an image is captured and sent via MMS (the multimedia messaging service) and the system performs hierarchical classification of the voice input. In this embodiment, the system may include a "voice gateway" which is itself an assembly of components that connect a user's telephone (thru the public switch telephone network, or PSTN) to a computer system.

Referring now back to FIG. 2, in this embodiment, the voice tagging system 218 may be configured to operate an interactive voice response system (IVR). The IVR system may process a user's keypad inputs and direct the voice gateway to play and/or record audio streams (also called audio clips or voice clips). The system may also include a wireless handheld phone capable of recording and displaying images and with a wireless data connection the voice tagging system 218. Like before, images (or other digital media) may be stored and linked in the database 220. The system may also include one or more interfaces to external (to the subject IVR) services used to notify other users of new bookmarks. Examples are the public domain email network, the SMS (short message service) and MMS (multimedia message service) networks owned and operated by wireless carriers (service providers), and the public switched telephone network (PSTN).

In this embodiment, a user calls the IVR system on any mobile camera phone connected to the PSTN, and goes thru the following step to hierarchically classify a photo: 1. the user takes a photo with their camera phone; the user sends the photo (using email or MMS) from their mobile phone to the IVR service; 3. the IVR service stores the photo in the database and adds the photo to a queue of untagged photos; 4. the user logs on to the IVR service. The caller ID of the user's telephone or explicit logon also is used to identify the user; the user uses an IVR menu to select the photo by listening to a text-to-speech (TTS) generation of metadata associated with each untagged photo. In this embodiment, the upload time of each untagged photo in the queue is used; the user is then prompted by the IVR if they would like to tag the photo and, if so, an IVR menu tree is constructed from the previously recorded hierarchy of voice tags; 8. at each level N of the IVR menu tree, said user is prompted to: a) select an appropriate tag, b) create a new tag or c) delete a tag; 9. If the user has selected an appropriate tag, then the voice tags at level N+1 are retrieved; and 10. If no more specific tags are available, then the voice tag is stored with the photo.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a client computing device, the client computing device including a media object capture device and a voice capture device and running a client application that associates media objects to voice samples;
    a communications network coupled to the client computing device;
    a voice tagging system coupled to the communications network and receiving at least one association between a first media object and a first voice sample, the voice tagging system receiving the first voice sample from an unidentified user and the voice tagging system being configured to identify the unidentified user that provided the first voice sample based on analysis speech components of the first voice sample; and
    a database coupled to the voice tagging system, the database including one or more existing voice tags, each voice tag being coupled to one or more existing voice samples and including at least one voice tag coupled to two different voice samples,
    wherein the system includes programming causing phoneme representations of the existing voice samples in the database to be compared to a phoneme representation of the first voice sample, wherein said comparing is based on an initial number of phonemes at the start of the first voice sample and the existing voice samples that is less than the total number of phonemes and includes sequentially comparing phonemes of a first existing voice sample to the phoneme representation of the first voice sample wherein earlier phonemes are weighted higher than later phonemes.

2. The system of claim 1, wherein the client computing device is a cellular phone.

3. The system of claim 1, wherein the first media object is an image.

* * * * *